United States Patent Office.

CHARLES S. PHILIPS, OF BROOKLYN, NEW YORK.

PROCESS OF MATURING COFFEE.

SPECIFICATION forming part of Letters Patent No. 251,133, dated December 20, 1881.

Application filed December 23, 1880. (No specimens.)

*To all whom it may concern:*

Be it known that I, CHARLES S. PHILIPS, of Brooklyn, in the county of Kings and State of New York, have invented certain new and useful Improvements in the Process of Treating Coffee for the Purpose of Improving its Quality and Flavor, of which the following is a specification in such full, clear, concise, and exact terms as will enable others skilled in the art to which my invention appertains to make use of the same.

Heretofore coffee has been treated by subjecting it to the action of steam or vapors of highly-heated water in direct contact with the coffee at temperatures ranging from 120° to 212° Fahrenheit. Such treatment does not allow the coffee to ferment or sufficiently improve the quality of the berry, but simply changes the color to darker shades. It also saturates it to such an extent that it must be dried after coming from the process.

The object of my invention is to eliminate the rank or undesirable element of the berry by fermentation, for the purpose of improving its quality and flavor.

To carry my invention into effect I place the coffee, either in bulk or bags, into tight wooden vessels or boxes, so that the steam or moisture will not come in direct contact with the coffee, and then subject the coffee-containing vessels to a moist heat at temperatures ranging between 60° and 120° Fahrenheit, which heats will not kill but facilitate fermentation. The fermentation is carried on from five to twenty days, or until the coffee has been sufficiently reduced of its rank or undesirable elements. This process may, however, be continued for any length of time, in case the coffee should be very rank, without injuring it, as the moisture cannot come in direct contact with the coffee, except such small amount of moisture as may pass through the pores of the wood, and the air surrounding the coffee-containing vessels may be kept fully saturated without endangering the coffee by overwetting it. Only enough moisture to keep the coffee soft and in a fermentable condition will penetrate the interior of the coffee-containing vessels. This is an important feature, and I think a requisite condition to the proper treatment of coffee where its quality and flavor are to be improved. After fermentation is once established, which is best induced at a temperature between 60° and 90° Fahrenheit, and has been continued for some little time, a heat may be used ranging from 90° to 120° Fahrenheit. The higher temperatures should be gradually applied as the nature and condition of the coffee may seem to require. Usually the slower these higher heats are worked up to the better. I prefer not to increase the heat over 110° Fahrenheit, except for rank or strong coffees, as fermentation does its work more thoroughly and rapidly by using a low heat. After coming from the chamber the coffee will be found in such a condition as to moisture that no special after-drying process will be necessary; and the rank or strong coffees will be of a mild and pleasant character, and its quality and flavor much improved, while at the same time its commercial value will be greatly enhanced.

Having thus described my invention, what I claim as new, and desire to secure by Letters Patent, is—

The process of treating coffee which consists in inclosing the immature coffee in tight wooden boxes or vessels, which are subjected to moist heat in a room or apartment at from 60° to 90° Fahrenheit until fermentation is induced, and continuing the process at a temperature not above 120° Fahrenheit for from five to twenty days, as the condition of the coffee may require.

CHARLES S. PHILIPS.

Witnesses:
JOHN A. STITT,
R. G. J. KENNARD, Jr.